United States Patent [19]
Petterson

[11] Patent Number: 5,950,985
[45] Date of Patent: Sep. 14, 1999

[54] CONNECTING DEVICE FOR CONNECTING FLUID CONDUITS

[75] Inventor: Tom Petterson, Syd-Koster, Sweden

[73] Assignee: Sune Sandh, Sweden

[21] Appl. No.: 08/750,368

[22] PCT Filed: Jun. 7, 1995

[86] PCT No.: PCT/SE95/00659

§ 371 Date: Dec. 9, 1996

§ 102(e) Date: Dec. 9, 1996

[87] PCT Pub. No.: WO95/33950

PCT Pub. Date: Dec. 14, 1995

[30] Foreign Application Priority Data

Jun. 9, 1994 [SE] Sweden .................................. 9401988

[51] Int. Cl.⁶ .................................................. F16L 29/00
[52] U.S. Cl. ................................. 251/149.1; 251/149.8; 285/331
[58] Field of Search .............................. 251/149.1, 149.8, 251/149.2, 149.5; 285/331, 238, 239

[56] References Cited

U.S. PATENT DOCUMENTS

| | | | |
|---|---|---|---|
| 656,759 | 8/1900 | Wirt | 251/149.8 X |
| 1,904,061 | 4/1933 | Larson | 251/149.1 X |
| 2,467,520 | 4/1949 | Brubaker | 285/331 X |
| 2,661,225 | 12/1953 | Lyon . | |
| 3,606,396 | 9/1971 | Prosdocimo et al. | 285/331 X |
| 3,612,101 | 10/1971 | Maximov et al. | 137/614.2 |
| 3,670,770 | 6/1972 | Nelson . | |
| 4,427,219 | 1/1984 | Madej | 285/331 X |
| 4,819,972 | 4/1989 | Champa et al. | 285/331 |

FOREIGN PATENT DOCUMENTS

| | | |
|---|---|---|
| 79 25391 | 4/1981 | France . |
| 810 335 | 8/1951 | Germany . |
| 925 326 | 3/1955 | Germany . |
| 1 265 515 | 4/1968 | Germany . |
| 28 15 661 | 12/1978 | Germany . |
| 465 180 | 8/1991 | Sweden . |

Primary Examiner—Kevin Lee
Attorney, Agent, or Firm—Lerner, David, Littenberg, Krumholz & Mentlik, LLP

[57] ABSTRACT

Coupling devices for quick connection and disconnection of fluid conduits are disclosed including a first coupler with a recessed seat and a seat passage hole communicating with the seat, a second coupler with a protruding portion for insertion into the seat when the two couplers are connected, and a seating surface for sealing contact with the seat in the first coupling. The two couplers are pivotable between angled and aligned relationships, and the apparatus includes a tap on the second coupler to permit a valve body opposite the seat to adopt a closed position when the two couplers are in an angled relationship and to bring the valve into an open position when the two couplers pivot into an aligned position.

5 Claims, 6 Drawing Sheets

CONNECTING DEVICE FOR CONNECTING FLUID CONDUITS

The present invention relates to coupling devices for fluid conduits which comprise a first and a second main part each arranged to be attached to a respective portion of the conduit and arranged to be connected or disconnected, so as to form a fluid duct between the two conduit portions in the connected position.

BACKGROUND OF THE INVENTION

Coupling devices of this main type are previously known for connecting sections of pipes or hoses. Many different types of such coupling devices are known. One type which is of particular interest in connection with the present invention is that in which at least one main part of the coupling is provided with a valve which automatically closes the fluid duct in the part in question when it is disconnected from the other part. This function prevents, in the disconnected state of the coupling, the fluid from flowing out. The coupling device according to the invention has particular advantages since it is arranged like this type of coupling, which is provided with a valve.

Furthermore, the coupling device according to the invention relates to the field of quick couplings, i.e. the connecting and disconnecting operation can be carried out very quickly by means of a simple manoeuvre. Quick couplings of this kind are of a more developed type of couplings, as compared with the more conventional type which includes screw elements for connection of the two parts. This is something which implies that the connection and disconnection operation takes a longer time, since the turning of the screw element takes a certain time.

A drawback which is related to quick couplings is that a relatively high force must be used during connection and locking of the coupling parts to each other.

This force can be very high if one of the coupling parts is provided with a valve of said type and if this valve is influenced by a certain pressure from the fluid, since the valve body must be displaced against the force of the pressure by forcing the coupling parts together.

SUMMARY OF THE INVENTION:

An object of the present invention is to provide a coupling device of the above-mentioned type which is designed as a quick coupling in which the coupling parts can be connected and locked to each other easily and quickly.

Another object is to facilitate the connection operation in couplings provided with a valve of the above-mentioned type by decreasing the force for opening of the valve which must be applied against the coupling parts by the person who is to connect them.

The object of the invention is obtained by providing the coupling with the features which are stated below.

BRIEF DESCRIPTION OF THE DRAWINGS

Three embodiments of the coupling according to the invention will be described below, with reference to the annexed drawings, in which

FIG. 5 shows a central cross-section of the two parts of the coupling completely connected to each other, wherein FIGS. 1–5 show the first embodiment;

PREFERRED EMBODIMENTS

The coupling consists of two main parts, each of which are mounted on one end of a hose. However, the coupling can be adapted for mounting on pipe ends.

Figure 3:
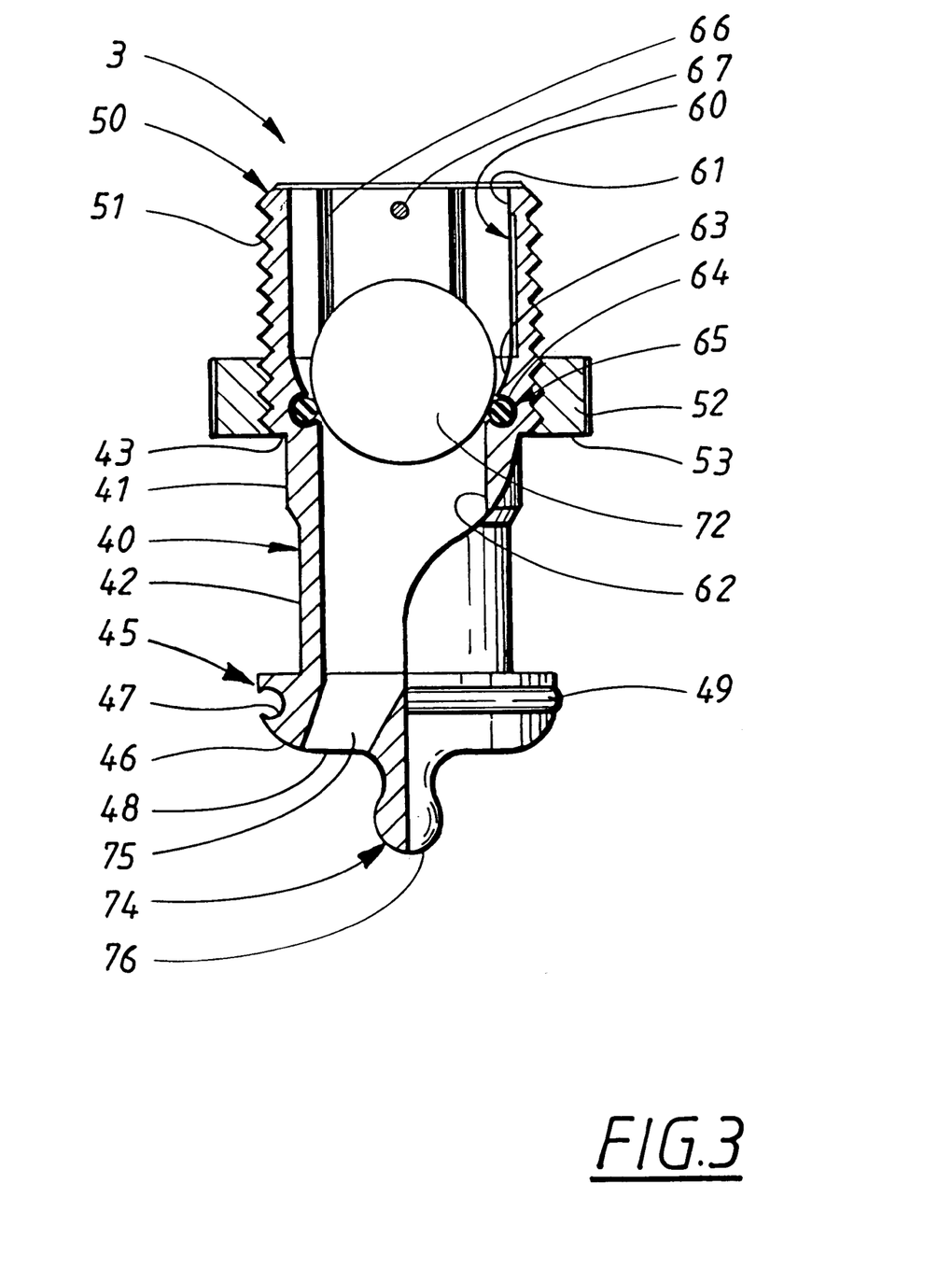
FIG. 3 shows a central cross-section of a second part of the coupling.

In the embodiment according to FIGS. 1–5, a first part 1 is shaped as a female part of the coupling with a hollow seat 2 provided for a second coupling part 3, which can be designated a male part. A cross-section of the second part 3 is shown in FIG. 3.

Figure 1:
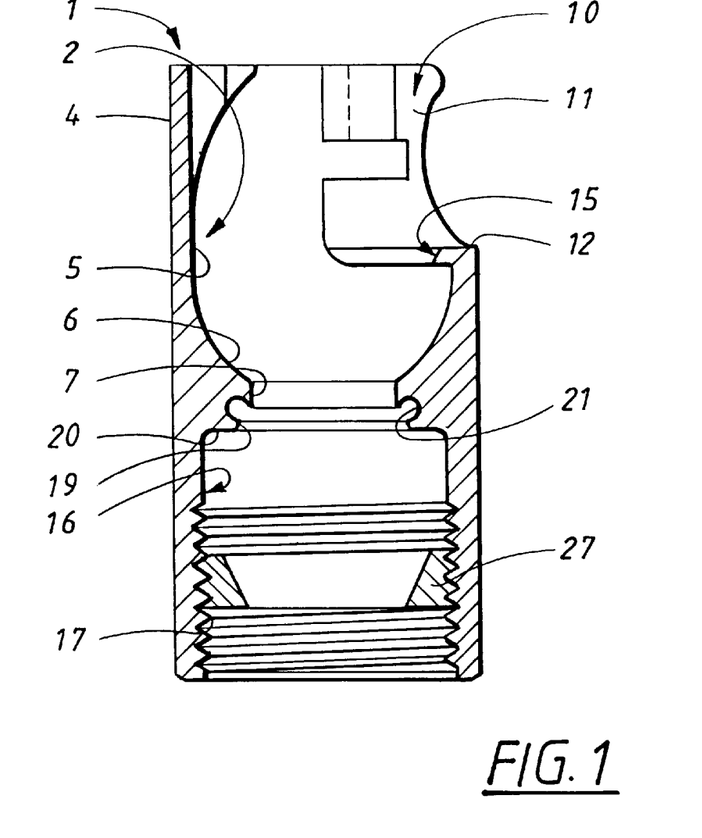
FIG. 1 shows a central cross-section of a first part of the coupling.
Figure 2:
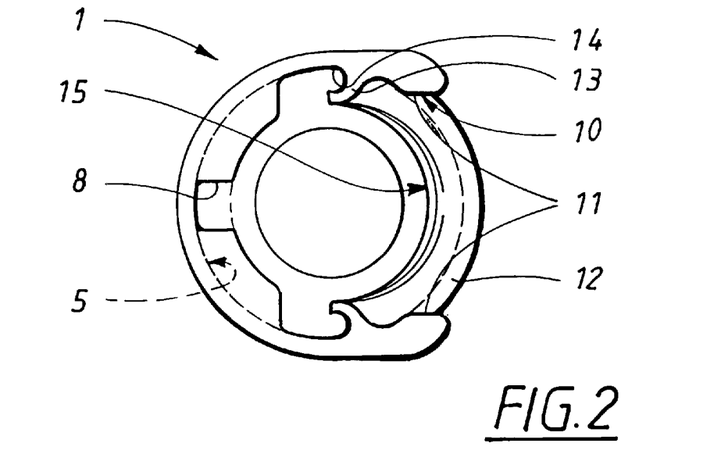
FIG. 2 shows an end view of said first part.

The first part is essentially shaped as a cylinder with a cylindrical outer surface 4. The seat 2 opens out at one end of the cylindrical body with a cylindrical portion 5 forming an insertion hole which is coaxial in relation to the cylindrical outer surface 4. At the inner end of the surface 5, it turns into a spherical surface 6, i.e. the actual seat, which has a central hole 7 which has a smaller diameter than the hole formed by the surface 5 but which is coaxial in relation to the latter and to the centre of the spherical surface 6. The outermost part of the seat includes an inwardly curved portion which is intersected by a groove 8.

At one end of the cylindrical body, the wall between the surfaces 4 and 5 is cut away and forms a slot 10 with parallel sides 11 which are connected with a bottom 12 which forms a 180° cylindrical surface. The inner part of the slot 10 is provided with protrusions 13 (FIG. 2), which project over the slot surfaces 11. On the outside of the protrusions, recesses 14 giving the protrusions the shape of tongues are arranged. In this manner, the protrusions are adapted to be resilient so that their tongue-shaped portions can be bent.

A flange 15 extends in the inwards direction from the surface 5, flush with the bottom of the cylindrical surface 12 where the latter meets the spherical surface 6.

A hole 16 with a screw thread 17 extends from the second end of the cylindrical body which forms the first part 1. The thread ends a short distance from a shoulder 20, which connects with the hole 7 via a conical surface 19 having a groove 21 for a sealing ring.

Figure 4:
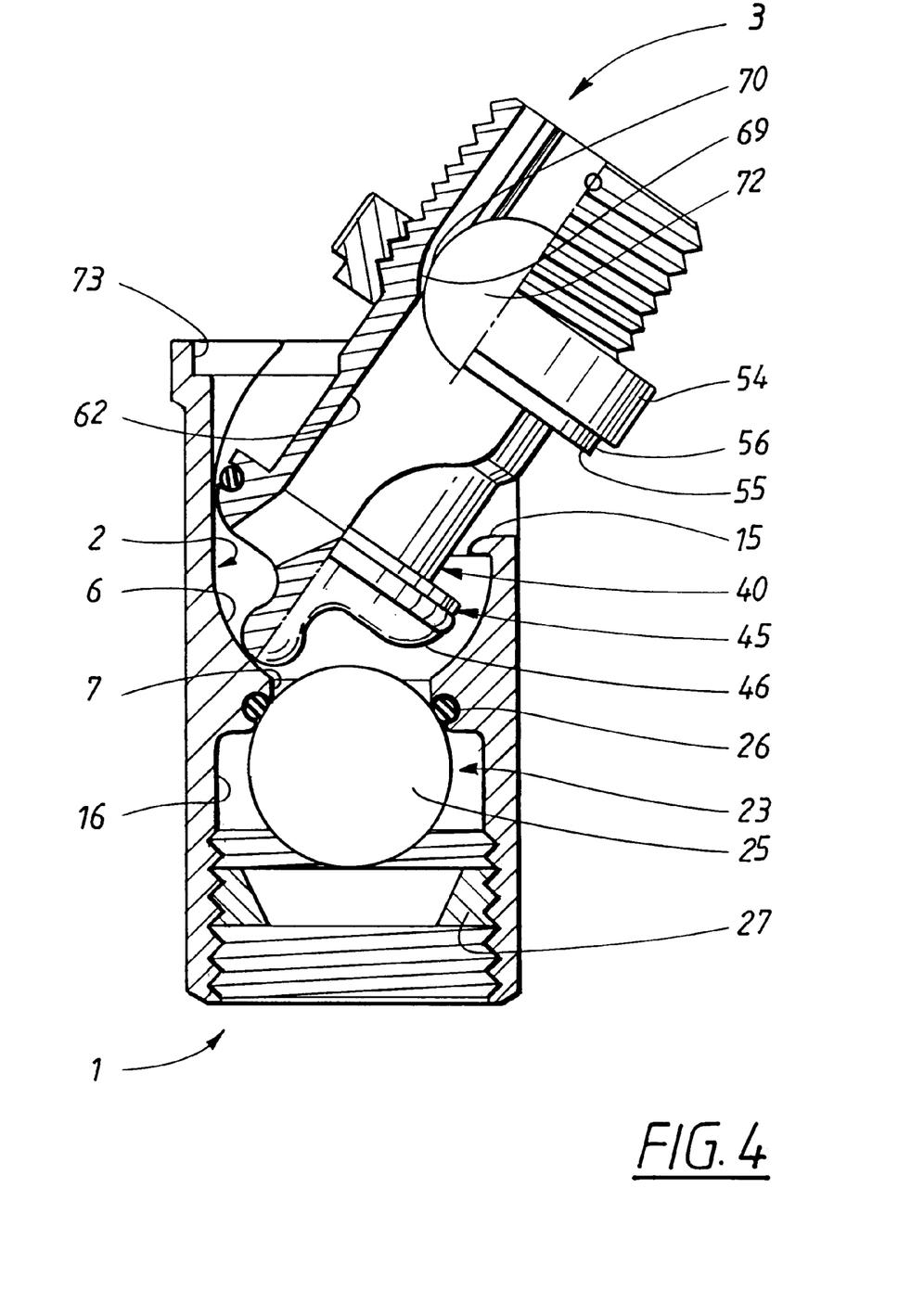
FIG. 4 shows the two parts of the coupling during connection thereof, the first part being shown as a central cross-section and the second part being shown half as a cross-section and half as a view.

As is apparent from FIG. 4, the first coupling part 1 in the first embodiment is provided with a valve 23 which is arranged to be closed when the two coupling parts are not connected to each other (FIG. 4) and to be opened when the two coupling parts are connected and locked (FIG. 5) together.

The valve 23 consists of a valve body 25 in the form of a ball, which in the closed position is arranged to rest against the surface 19 and a sealing ring 26 arranged in the groove 21. A stop ring 27, which prevents the valve body 25 from falling out of the hole 16, is screwed on the thread 17.

A pressure spring can be inserted between the valve body 25 and the part 27 in order to press the valve body to its closed position. In most cases, the fluid pressure acting against the valve body will provide this function.

The other coupling part 3 will now be described with reference to FIG. 3. It has a protruding, cylindrical portion 40 with an inner, thicker portion 41 which extends from a flange 43, and an outer, narrower portion 42. A head 45 with a spherical surface 46 is arranged at the outer end of the portion 40. The head is intersected by a groove 47 and ends with an end surface 48.

From the opposite end of the part in relation to the portion 40, a socket 50 with a thread 51 is arranged. This thread is intended for connection of the part 3 to a guiding nipple, to be described below, and it also carries a locking ring 52 with a plane 53.

Figure 5:
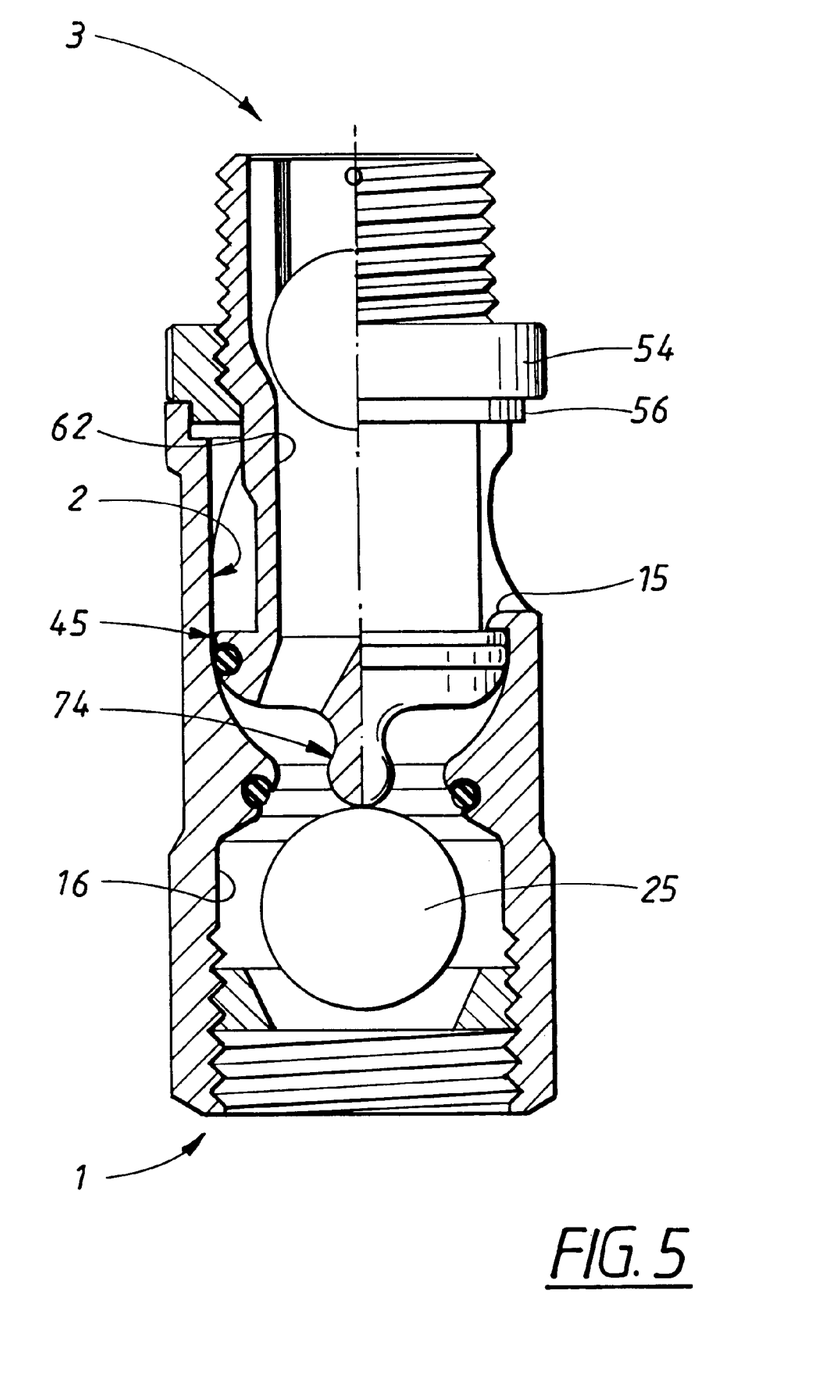

In the embodiment according to FIGS. 4 and 5, the locking ring has an alternative design and has reference numeral 54. It is provided with a protrusion 55 with a diameter 56.

A hole 60, which extends from end to end on the part 3 is arranged concentrically in relation to the outer surface of the part 3. The hole 60 has a larger diameter 61 facing the end which is provided with the thread 51 and a smaller diameter 62 facing the head 45. In the transition section from the larger diameter to the smaller one, a valve seat is arranged, which valve seat is shaped as a conical surface 63 with an O ring groove 64 in which an O ring 65 is arranged. In part of the hole which has the diameter 61, a number of bars 66 are arranged in the longitudinal direction of the hole. Farthest away, a pin 67 extends over the hole.

This applies to the embodiment according to FIG. 3. In alternative embodiments according to FIGS. 4 and 5, the valve seat is formed by a conical surface 69 which is not provided with an O ring, but which is provided with protruding bars 70.

A valve body 72 in the form of a ball is intended to rest against the seat, i.e. the cones 63 and 69, respectively. The ball's diameter 61 has a relatively large clearance in order to allow a fluid to pass. However, the ball is guided in a mid position by means of the bars 66. The ball is prevented from falling out by means of the pin 67.

According to FIG. 3, the ball can seal by means of the contact against the O ring 65 in the cone 63 (if the ball has a soft surface, it may obtain a complete sealing without the seat being provided with any O ring). In the embodiment according to FIGS. 4 and 5, however, the ball 72 does not seal in the seat. Instead, gaps are provided between the ball and the conical surface 69 due to the fact that the ball rests against the bars 70. The magnitude of the gaps is determined by the height of the bars. The purpose is to press the ball against the seat by means of a fluid pressure in the conduit branch which is connected to the part 3. In this manner, and in accordance with FIG. 3, a complete sealing preventing the fluid from flowing out is accomplished. On the other hand, in the alternative embodiment according to FIGS. 4 and 5, a slow discharge of the fluid is obtained, so that the fluid is prevented from pouring out in conduits for fluids if the coupling parts are separated. For gases under pressure, it may be preferred that the conduit which is separated from the pressure source is pressure relieved slowly in order to prevent an explosive discharging of the pressure medium taking place, which may occur through the gap formed by the bars 70.

In the centre of the conduit 62, a tap 74 is carried by several bars 75. The tap 74 presents an end 76 which is arranged at a distance from the end surface of the head 48. The end 76 of the tap should more or less be arranged on the imagined continuation of the spherical surface 46 of the head.

The radius of the spherical surface 46 is essentially equal to the radius of the spherical surface 6 of the seat 2 in the first part 1. The length of the portion 40 is adapted so as to permit the thread 51 and the locking ring 52/54 to be situated slightly outside the end of the first part 1 when the spherical surface 46 rests against the spherical surface 6, as is shown in FIG. 5. The thicker portion 41 of the portion 40 has a slightly larger diameter than the distance between the two protrusions 13 of the first part (see FIG. 2). However, the diameter is not so large that the portion 41 cannot be forced to inside the protrusions under springing action thereof, to a position which is coaxial in relation to the surface 5 in the first part 1. The diameter of the outer portion 42 of the protruding portion 40 is slightly smaller than the distance between the surfaces 11 in the groove 10 of the first part 1.

An O ring 49 is arranged in the groove 47 of the second part 3, which O ring when released extends outside the imagined spherical surface which connects the two spherical portions of the surface 46.

The first part 1 is provided with an end surface 77 around the inlet opening of the seat 2 in order to provide a contact with the locking ring 52 according to FIG. 1. According to FIG. 4, the inlet hole of the seat is provided with a cylindrical surface 73 which has a slightly larger diameter than the diameter 56 of the locking ring 54.

Figure 6:
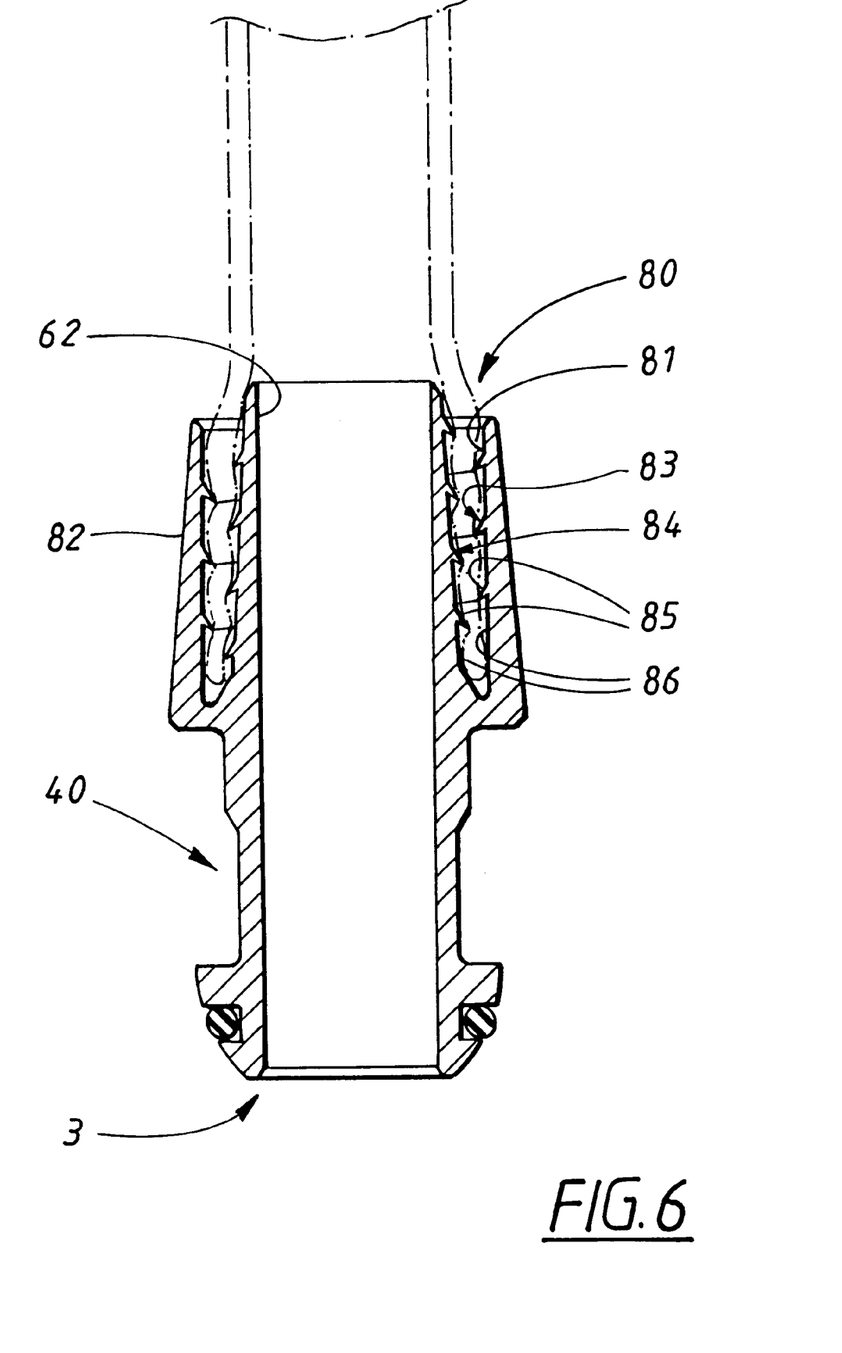
FIG. 6 shows a central cross-section of a portion of the other main part of the coupling according to the other embodiment.

According to the second embodiment which is shown in FIG. 6, the second part has the same shape as that which has already been described with reference to the portion 40. However, the socket 50 provided with the thread 51 is in this case replaced by a socket 80 with a groove 81 which extends from its outer end and divides the tubular body between an outer surface 82 and the hole 52 into an inner and an outer portion which are coaxial in relation to each other.

The outer wall in the groove 81 is provided with a thread 83 and the inner wall is provided with a second thread 84. In both threads, the protruding portions 85 of the thread path are separated by relatively wide, recessed sections 86, which together form conical surfaces which form the main part of the walls of the groove. The protruding portions 85 are elongate and face inwards, towards the bottom of the groove 81. A valve, such as that which is shown in FIGS. 3, 4 and 5, is not shown in FIG. 5, and neither is a locking ring shown. However, these components may also be included in the embodiment shown in FIG. 6.

Figure 7:
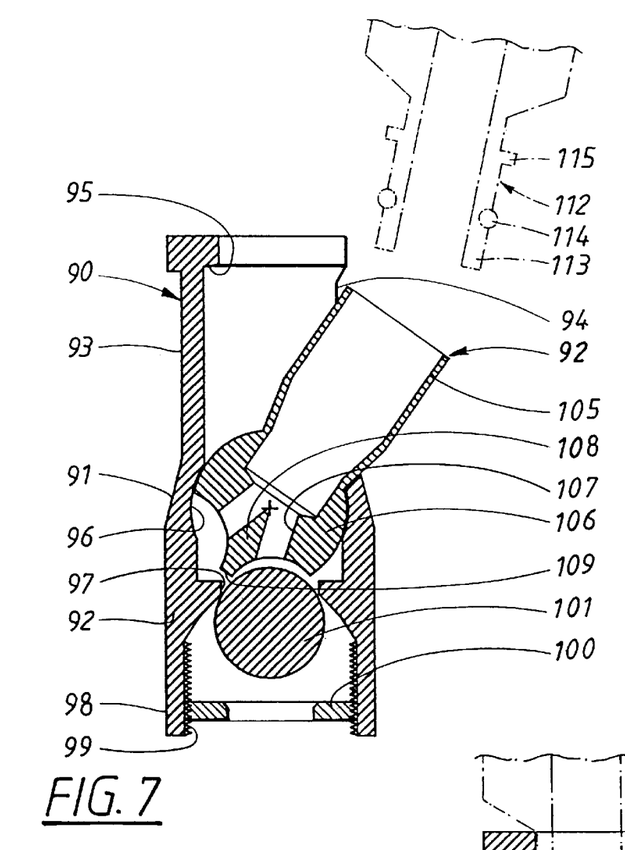
FIGS. 7 and 8 show the third embodiment as a cross-section, in a non-connected position as well as a completely connected position.
Figure 8:
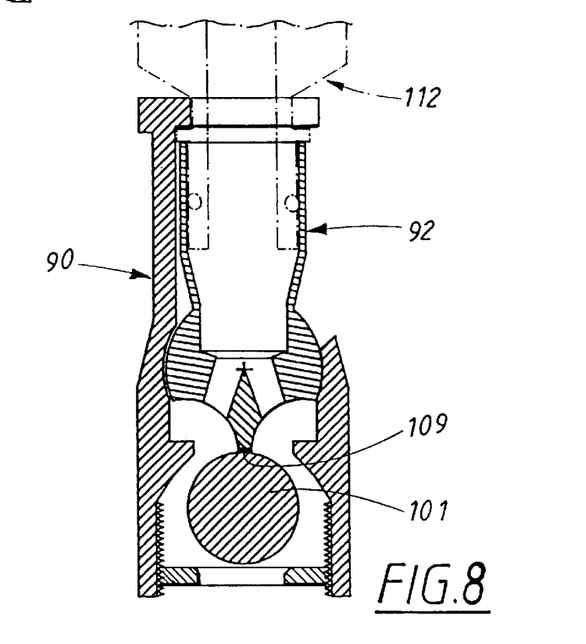

The third embodiment is shown in FIGS. 7 and 8 and is also provided with a valve on the pressure side, which valve is kept closed in a non-connected position and opened in a connected position. In this regard, FIG. 7 shows the first-mentioned position and FIG. 8 shows the latter position. According to the drawings, the coupling presents a first part 90 which is intended to be connected to the pressure side of a fluid conduit. This conduit consists in turn of an outer part 91 and an inner part 92. The outer part consists of a cylindrical tubular portion 93, the circumference of which is cut away approximately 120° by means of a groove 94. The portion ends at one of the ends with an outwardly facing flange 95 and passes in the other direction into a seat 96, which is spherical in both directions, and thereafter an inwardly facing flange 97. After the flange, the part 91 ends with a cylindrical portion 98 with a thread 99 on which a stop ring 100 is screwed. A valve ball 101 is arranged between the stop ring 100 and the flange 97, whereby the edge of the flange facing the bottom portion 98 is shaped as a valve seat. The part 92 presents an outer portion 105 which passes into a spherical portion 106 which fits in the internal spherical portion 96.

In use, the two parts 90 and 92 are intended to be kept together by snapping them together using the elasticity of the material, which is the result of the choice of dimensions and materials. In this manner, the part 92 becomes pivotable in the part 90, which is apparent when comparing FIGS. 7 and 8. In this regard, it can only pivot in one direction, since the cylindrical outer part 105 of the part 92 is guided in the groove 94.

A hole 107 extends through the spherical portion 106, in which hole is arranged a centre tap 108 through the bars between the hole and the tap. The tap 108 has an end surface 109 which is situated so that, when the part 92 is fully pivoted as is shown in FIG. 7, the tap does not contact the ball 101 and is kept in position by means of the water pressure, possibly under the influence of a spring arranged between the ball and the stop ring 100.

However, if the part 92 is pivoted concentrically into the cylindrical portion 93 the tap will point straight towards the ball, and by means of its end surface 109 it will keep it in an open position.

The two main parts of the coupling are intended to be mounted at a respective end of sections of a conduit in the form of a pipe or a hose.

In the embodiment according to FIGS. 1–5, it is assumed that these ends are provided with threaded connection devices intended for cooperation with the threads 17 and 51. It should be noted that one of the conduit sections is provided with means having a screw thread which can be screwed in the hole 16, and the other section is provided with means having an inner thread which is arranged to be screwed to the threaded socket 50.

When the two conduit parts provided with the first 1 and the second coupling part 3, respectively, are to be connected, the second part is brought to a position with the portion 40 resting against the surface 12 of the groove 10. Next, the tap 74 is inserted through the groove 8.

The centre axis of the second part 3 thus forms an angle with the centre axis of the first part 1.

The next step in the connection operation is to pivot the second part in relation to the first part, via the position which is shown in FIG. 4 to a fully connected position which is shown in FIG. 5. During this, the rear side of the head 45 slides against the inner end of the flange 15 and the spherical surface 46 on the second coupling part will reach the spherical surface 6 of the first coupling part and slide along it until the spherical surfaces rest against each other under compression of the O ring 49.

In this position, see FIG. 5 the rear side of the head 45 rests against the inner side of the flange 15 and the second coupling part is kept in place in the seat 2 of the first part. During the pivoting of the second part, the portion 41 of the cylindrical portion 40 will pass the protrusions 13 which are firstly bent outwards for allowing the portion to pass and, when the other coupling is in the position which is shown in FIG. 5, they will snap out and hold the second part in a locked position.

With respect to the opening of the valve body in the first part 1, the following should be noted: when the head 45 of the second part is brought into its position in the seat 2 of the first part, the tap 74 of the head will be pressed against the valve body 25 so that it is moved against the force of the fluid pressure (or the above-mentioned spring) away from the surface 19 to an open position, which is shown in FIG. 5.

The valve body 25 is positioned so as not to reach contact with the tap 74 of the part 3 during its pivoting to a locked position until its head has reached a position in which the entire circumference of the O ring 55 contacts the spherical surface 6 of the first part.

During pivoting of the two parts in relation to each other from the angular position, according to FIG. 5 the end edge 77 of the head 45 on the second part will pass the part of the valve body 25 which protrudes through the conduit 7 without contacting it. In fact, the head 45 is so short that an empty space is formed around the tap 74, which space allows the edge on its spherical surface 46 to pass. This design prevents the valve from opening before the two parts have reached a position in which they seal against each other.

When the parts, during a continued pivoting, assume a straight position in relation to each other according to FIG. 5, the tap 74 touches the portion of the valve body 25 which faces the tap. During a finishing pivoting of the parts the tap brings the valve body away from the surface 19 so that free passage through the two parts is allowed. In this regard, the valve body is displaced against the force of the pressure in the conduit connected to the part 1 or against the pressure of a spring if such a device is arranged between the valve body and the ring 27.

It is important that the two parts are not pivoted out of their common, straight position after connection of the two parts, since in this case the passage is broken. A certain assurance that this does not occur is obtained by means of the tongues 13 which spring outwards. However, their retaining action is limited. If further assurance is desired, a locking arrangement of the above-mentioned type can be used, i.e. by providing the locking ring 52 or 54. In this regard, the locking ring is screwed to the thread 51 so far that it can pass the edge on the end surface of the first part 1 which protrudes the farthest during pivoting of the parts to a straight position. Thereafter, the locking ring is screwed down.

The coupling parts are now connected and locked to each other. The fluid in the conduit can now flow therethrough and passes the part 1 and the valve body 25 on the outside thereof and through the hole 52 in the other coupling part, passing its valve body 72 which is opened due to the influence of the fluid pressure.

The coupling parts are disconnected by pivoting the second part 3 to the first-mentioned position and can thereafter be lifted out from the seat 2 by a movement in the direction of the centre axis of the first part 1. When the head 45 of the second part is pivoted out of the seat, the valve body 25 will move to a closed position as a result of the fluid pressure in the conduit portion which is connected to the first coupling part (or as a result of the pressure from a spring). When the two parts are disconnected, the valve will be closed before the O ring 55 is brought out of a sealing contact with the spherical surface.

The operation of the third embodiment according to FIGS. 7 and 8 will now be described.

As has been mentioned, the pressure conduit should be connected to the end of the part 90 where the thread 99 is situated. This may be carried out by using the thread or in another way. It is also possible to adapt the part 90 for use of the hose connection arrangement according to FIG. 6.

The other end of the coupling, which is represented by the cylindrical portion 105 of the part 92, can also be designed for various conduit connection applications. In this case also, the arrangement according to FIG. 6 can be used if the outer end of the portion 105 is designed for this purpose. However, FIGS. 7 and 8 suggest another possibility by means of dash dotted lines. A connection section 112 is arranged on the outgoing conduit, which section fits into the hole of the cylindrical portion 105 by means of a cylindrical portion 113 and which can seal it by means of an O ring 114. The portion 113 is limited by a flange which is dimensioned so as to be accommodated in the cylindrical portion 93 and to be pressed in between the inwardly protruding flange 95 and the end of the portion 105. In this position, the coupling section 112 is held in the part 92 and forms a passage which forms an extension of the hole 107 in the part 92. However, if the part 92 is pivoted outwardly, the ball 101 will first close, as is shown in FIG. 7. In this regard, the flange 115 of the coupling section will be released from the flange 95 and the coupling section can be pulled out so that the inward and the outward conduits are disconnected.

An advantage which is attained when the valve body is shaped as a ball is that it need not be guided. Independent of the rotational position it assumes, its spherical surface will contact the surface 19 or 97, respectively, in the closed position. Furthermore, it will be centered to this surface during contact. However, if guiding against rotation and/or for centering is provided, the ball may be replaced by a valve body with another shape.

The coupling device according to the described embodiments is primarily intended for a conduit, one end of which is connected to a container or a pump from which the fluid is delivered. Of the coupling parts, the first coupling part is—in the joint between the conduit parts—connected to the end which faces the flow from the container or the pump, whereas the other coupling part is mounted at an end which faces the part of the conduit from which the fluid is discharged, for example from a tapping place. With such an arrangement, the flow from the fluid source will be interrupted by the action of the valve when the coupling is disconnected.

After disconnecting the coupling parts, there will be no fluid supplied to the conduit part which is connected to the second coupling part, and in such cases it is not necessary to arrange a shut-off valve in this coupling part. However, a valve arrangement in both coupling parts should no be excluded in the coupling according to the invention. In this manner, the valve in the second part can be arranged for an automatic operation as has been described.

The alternative embodiment according to FIG. 6 is arranged for holding a conduit part such as a hose or a pipe made from an elastic material such as plastic or rubber. Connection means are not required on the conduit ends. The ends can be attached to the parts of the coupling without any particular preparation.

The groove 81 in the coupling part is dimensioned at its outer opening so as to receive the end of the hose or the pipe with a very small clearance so that the conduit part can be inserted a short distance into the groove. Thereafter, the hose or pipe is turned in relation to the coupling part, which then is screwed to the conduit end by the action of the protruding portions 85 to the threads on the sidewalls of the groove. Since the groove is tapered, the protruding portions will be forced into the elastic material in the hose or the pipe.

Furthermore, the material in the hose or the pipe will be deformed into a wave-shape between the walls of the groove, as is apparent from the cross-section, since the protruding portions 85 on the outer wall and the corresponding portions on the inner wall of the groove are displaced in relation to each other.

If the dimensions of the groove and the conduit are properly adapted to each other, a satisfactory holding action is obtained by means of the arrangement. This is obtained by very simple means and without any additional elements.

Finally, it should be mentioned that the described coupling parts need not be arranged for connection to hose or pipe conduits, as has been shown, but can be arranged as stationary fittings. This means that the part 1 can be arranged as a connection point on a pump, a compressor or a pressure vessel, for example. The part 3 can be arranged as a connection means directly on some type of tool.

I claim:

1. A coupling device for quick connection and disconnection of fluid conduits, comprising:
   (a) a first part defining a recessed seat including an inlet hole ending in a rotational surface and defining an insertion hole, said first part further defining a seat passage hole communicating with said seat;
   (b) a second part having a protruding portion for insertion into said seat when said first and second parts are connected, said second part further having a sealing surface at an end of said protruding portion for sealing contact with said rotational surface of said seat, said first and second parts being pivotable in relation to each other between an angled relationship in which said parts are angled in relation to each other, and an aligned position in which said parts are essentially aligned;
   (c) cooperating locking surfaces on each of said first an d second parts for locking said protruding portion in said seat;
   (d) fluid ducts extending through each of said first and second parts, and connectors for attaching the conduits to respective ones of said fluid ducts;
   (e) a valve body on an end of said seat passage hole opposite said seat, said valve body being displaceable between a closed position against an edge of said seat passage hole and an open position spaced away from said edge;
   (f) a tap positioned on said second part so as to permit said valve body to adopt said closed position when said first and second parts are in said angled relationship, said tap having a tap surface for contacting said valve body and keeping said valve body in said open position when said first and second parts are in said aligned position, said tap bringing said valve body to said open position as said first and second parts pivot from said angled relationship to said aligned position, said relationship of said first and second parts including:
      a first angular position in which said valve body is in said open position, said sealing surface of said second part is in sealing contact with said rotational surface of said seat and said parts are locked to each other by said cooperating locking surfaces;
      a second angular position in which said two parts are in a sealing contact but in which said tap surface is not keeping said valve body in s aid open position; and
      a third angular position in which said first and second parts are released from each other; and
   (g) said coupling device further comprising a connector on an end of one of said conduits for inserting into said intersion hole in a sealing position.

2. The coupling device as claimed in claim 1, further comprising:
   (a) an inwardly extending flange in said inlet hole of said first part, said flange defining one of said locking surfaces; and
   (b) a connector flange on said connector defining a connector locking surface, said inwardly extending flange being configured for positioning outside said connector flange, and said connector locking surface being outside of said insertion hole of said first part and in contact with said inwardly extending flange forming the other of said locking surfaces;

whereby said locking surface of said first part locks said second part in said first part by locking said connector in said insertion hole.

3. The coupling device as claimed in claim 1, wherein said seat of said first part is sufficiently elastic and is so shaped in relation to said protruding portion of said second part that said first and second parts may be snapped together, whereby said first and second parts are releasably held together in said aligned position.

4. A coupling device for quick connection and disconnection of fluid conduits, comprising:

(a) a first part defining a recessed seat including an inlet hole ending in a rotational surface, said first part further defining a seat passage hole communicating with said seat;

(b) a second part having a protruding portion for insertion into said seat when said first and second parts are connected, said second part for connection to a pressure source by means of said first part, and for connection to an end of one of said conduits, said second part further having a sealing surface at an end of said protruding portion for sealing contact with said rotational surface of said seat, and a valve comprising a valve body arranged to close said fluid duct when subjected to a pressure from said one of said conduits and to open when subjected to a pressure from said pressure source, said first and second parts being pivotable in relation to each other between an angled relationship in which said parts are angled in relation to each other, and an aligned position in which said parts are essentially aligned;

(c) cooperating locking surfaces on each of said first and second parts for locking said protruding portion in said seat;

(d) fluid ducts extending through each of said first and second parts, and connectors for attaching the conduits to respective ones of said fluid ducts;

(e) a valve body on an end of said seat passage hole opposite said seat, said valve body being displaceable between a closed position against an edge of said seat passage hole and an open position spaced away from said edge; and (f) a tap positioned on said second part so as to permit said valve body to adopt said closed position when said first and second parts are in said angled relationship, said tap having a tap surface for contacting said valve body and keeping said valve body in said open position when said first and second parts are in said aligned position, said tap bringing said valve body to said open position as said first and second parts pivot from said angled relationship to said aligned position, said relationship of said first and second parts including:

a first angular position in which said valve body is in said open position, said sealing surface of said second part is in sealing contact with said rotational surface of said seat and said parts are locked to each other by said cooperating locking surfaces;

a second angular position in which said two parts are in a sealing contact but in which said tap surface is not keeping said valve body in said open position; and a third angular position in which said first and second parts are released from each other.

5. A coupling device as claimed in claim 4, wherein said valve in said second part further comprises a choked shunt conduit so that the valve body allows a slow discharge from said one of said conduits after said first and second parts have been separated from each other.

* * * * *

UNITED STATES PATENT AND TRADEMARK OFFICE
CERTIFICATE OF CORRECTION

PATENT NO. : 5,950,985
DATED : September 14, 1999
INVENTOR(S) : Tom Petterson

It is certified that error appears in the above-identified patent and that said Letters Patent is hereby corrected as shown below:

Column 8, line 26, "an d" should read --and--.
Column 8, line 54, "s aid" should read --said--.

Signed and Sealed this

Thirteenth Day of June, 2000

Attest:

Q. TODD DICKINSON

*Attesting Officer*     *Director of Patents and Trademarks*